(12) United States Patent
Huwer

(10) Patent No.: US 11,926,214 B2
(45) Date of Patent: Mar. 12, 2024

(54) CONTROL SYSTEM FOR A VEHICLE

(71) Applicant: Volkswagen Aktiengesellschaft, Wolfsburg (DE)

(72) Inventor: Wojciech Huwer, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 502 days.

(21) Appl. No.: 17/312,282

(22) PCT Filed: Nov. 29, 2019

(86) PCT No.: PCT/EP2019/083025
§ 371 (c)(1),
(2) Date: Jun. 9, 2021

(87) PCT Pub. No.: WO2020/120163
PCT Pub. Date: Jun. 18, 2020

(65) Prior Publication Data
US 2022/0105804 A1 Apr. 7, 2022

(30) Foreign Application Priority Data
Dec. 13, 2018 (DE) ...................... 10 2018 221 704.1

(51) Int. Cl.
*B60K 35/00* (2006.01)
*G06F 3/0488* (2022.01)

(52) U.S. Cl.
CPC ............ *B60K 35/00* (2013.01); *G06F 3/0488* (2013.01); *B60K 2370/139* (2019.05);
(Continued)

(58) Field of Classification Search
CPC ............. B60K 35/00; B60K 2370/139; B60K 2370/197; B60K 2370/199;
(Continued)

(56) References Cited

U.S. PATENT DOCUMENTS 4,575,673 A * 3/1986 Tedeschi ................... H02J 3/14
323/284
4,755,634 A * 7/1988 Pepper, Jr. .............. G06F 3/045
341/20
(Continued)

FOREIGN PATENT DOCUMENTS

| CN | 105247251 A | 1/2016 | ............. B60K 35/00 |
| CN | 106662977 A | 5/2017 | ........... G06F 3/0488 |

(Continued)

OTHER PUBLICATIONS

International Search Report and Written Opinion, Application No. PCT/EP2019/083025, 18 pages, dated Feb. 10, 2020.
(Continued)

*Primary Examiner* — Hoi C Lau
(74) *Attorney, Agent, or Firm* — Slayden Grubert Beard PLLC

(57) ABSTRACT

The invention relates to a system comprising several touch-sensitive control elements that are arranged next to each other. It is provided that the control elements are able to communicate with each other via a voltage-controlled peer-to-peer line and determine when a particular control element should actively respond to touches or is deactivated.

19 Claims, 3 Drawing Sheets

(52) U.S. Cl.
CPC ............... *B60K 2370/141* (2019.05); *B60K 2370/1438* (2019.05); *B60K 2370/197* (2019.05); *B60K 2370/199* (2019.05); *B60K 2370/46* (2019.05)

(58) Field of Classification Search
CPC .......... B60K 2370/141; B60K 2370/46; B60K 2370/1438; G06F 3/0488
See application file for complete search history.

(56) References Cited

U.S. PATENT DOCUMENTS

| | | | | |
|---|---|---|---|---|
| 5,650,597 | A * | 7/1997 | Redmayne | G06F 3/0443 345/174 |
| 10,252,617 | B2 * | 4/2019 | Fribus | B60K 37/06 |
| 10,423,384 | B2 * | 9/2019 | Hewlett | G06F 3/04883 |
| 10,545,659 | B2 * | 1/2020 | Müller | G06F 3/0488 |
| 10,949,017 | B1 * | 3/2021 | Halsey, IV | G06F 3/04166 |
| 2005/0052426 | A1 * | 3/2005 | Hagermoser | H03K 17/962 345/173 |
| 2009/0309768 | A1 | 12/2009 | Pihlaja | 341/24 |
| 2011/0148799 | A1 * | 6/2011 | Waller | G01C 21/3664 345/173 |
| 2012/0113009 | A1 | 5/2012 | Hotelling et al. | 345/168 |
| 2012/0306783 | A1 * | 12/2012 | Lamb | G06F 3/04886 345/173 |
| 2014/0371987 | A1 | 12/2014 | Van Wiemeersch | 701/41 |
| 2015/0084514 | A1 * | 3/2015 | Anthony | H05B 47/175 315/131 |
| 2016/0109967 | A1 * | 4/2016 | Craig | G06F 3/016 345/179 |
| 2017/0168603 | A1 * | 6/2017 | Glotzbach | G06F 3/044 |
| 2017/0168675 | A1 * | 6/2017 | Giacomini | G06F 3/04845 |
| 2017/0292712 | A1 * | 10/2017 | Alexander | G06F 3/016 |
| 2018/0121157 | A1 * | 5/2018 | Hewlett | G06F 3/04883 |
| 2019/0011040 | A1 * | 1/2019 | Fribus | F16H 61/24 |
| 2020/0005690 | A1 * | 1/2020 | Gottsov | G06F 1/3265 |
| 2022/0105804 | A1 * | 4/2022 | Huwer | B60K 35/00 |
| 2023/0335091 | A1 * | 10/2023 | Morsy | G06F 3/0482 |

FOREIGN PATENT DOCUMENTS

| | | | |
|---|---|---|---|
| CN | 108474467 A | 8/2018 | ............ F16H 59/08 |
| DE | 102014204788 A1 | 9/2014 | ............ B60R 16/02 |
| DE | 102015216714 A1 | 3/2017 | ............ B60R 16/02 |
| DE | 102018221704 A1 | 6/2020 | ............ B60K 37/06 |
| EP | 2653335 A2 | 10/2013 | ............ B60K 37/06 |
| WO | 2016/206776 A1 | 12/2016 | ............ B60K 35/00 |
| WO | 2020/120163 A1 | 6/2020 | ............ B60K 37/06 |

OTHER PUBLICATIONS

German Office Action, Application No. 102018221704.1, 8 pages, dated Sep. 9, 2020.
Chinese Office Action, Application No. 201980082493.9, 13 pages, dated Oct. 23, 2023.

* cited by examiner

| 26 | 26 [V] | 26 [mA] | | 34 |
|---|---|---|---|---|
| 38 | >15,5 | >1,02 | >1,1 | S |
| 24 | 15,5...6 | 1,02...0,42 | 0,4...1,1 | S |
| 36 | <6...>2 | <0,42...>0,13 | <0,4...>0,1 | S v F |
| 30 | 2...0 | 0,13...0 | >=0,1 | F |

FIG. 2

CONTROL SYSTEM FOR A VEHICLE

CROSS-REFERENCE TO RELATED APPLICATIONS

This application claims priority to German Patent Application No. DE 10 2018 221 704.1, filed on Dec. 13, 2018 with the German Patent and Trademark Office. The contents of the aforesaid patent application are incorporated herein for all purposes.

TECHNICAL FIELD

The invention relates to a control system for a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the vehicle sector, for example in the case of motor vehicles, different solutions are known for realizing control elements. Touch-sensitive control elements are also used in this context. These are operated by the touch or approach of a user. Such touch-sensitive control elements may also be equipped with display functions, for example on touch displays. As a rule, touch-sensitive control panels provide a plurality of touch-sensitive control elements with which different functions of for example the vehicle may be operated. Functions in the area of information, entertainment, comfort or also light functions of the vehicle are mentioned merely as examples in this context.

With touch-sensitive control elements, undesired operation of a control element may occur, in particular while driving. The reasons for this are, on the one hand, vibrations and, on the other hand, the frequent spatial proximity of the control elements. If the user for example wants to set down his hand while operating the control element, another control element may also be unintentionally actuated.

SUMMARY

An object exists to provide a solution with which unintentional operation can be easily and reliably avoided.

The object is solved by the subject matter of the independent claims. Embodiments of the invention are discussed in the dependent claims and the following description.

BRIEF DESCRIPTION OF THE DRAWINGS

FIG. 2 shows a table of exemplary signal levels for the method from FIG. 1;

DESCRIPTION

Figure 1:
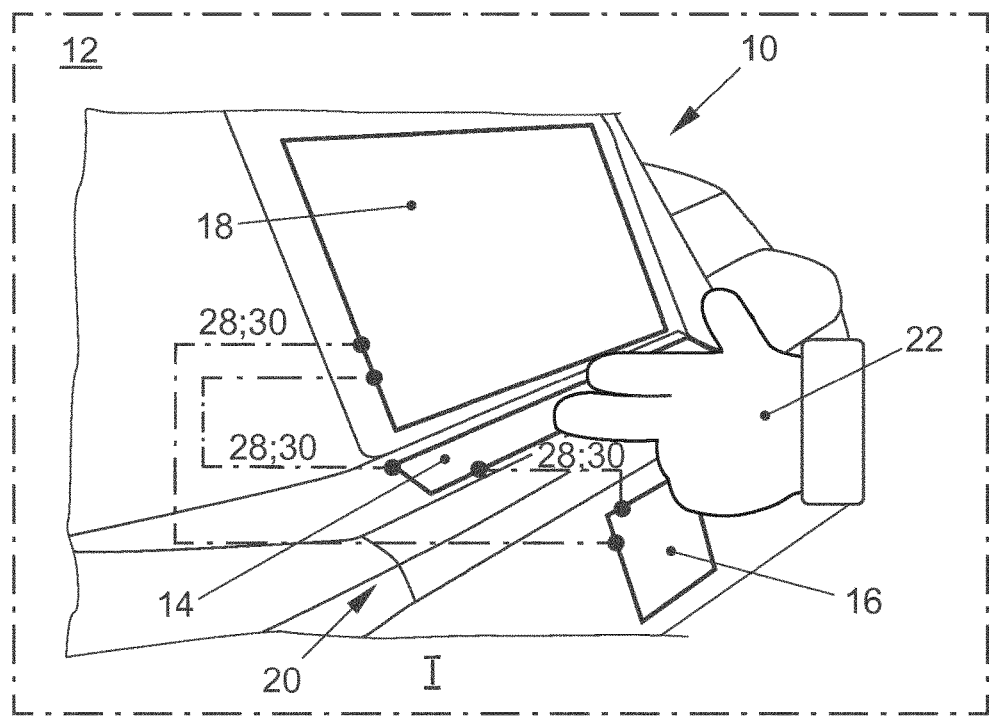
FIG. 1 shows, using signal levels, a schematic sequence of a process for operating a control system in one embodiment.
Figure 1:
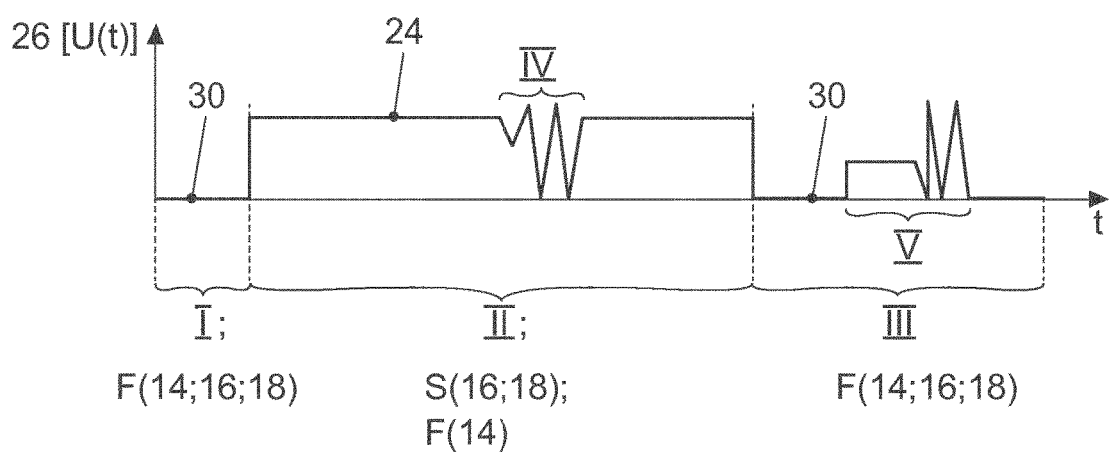

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first exemplary aspect relates to a control system for a vehicle comprising a plurality of touch-sensitive control elements that are each designed to generate a status signal, and in which the control elements are operatively connected to each other via a discrete electrical interface, and are designed to transmit their status signal via the discrete electrical interface to the other control elements, wherein if at least one control element is touched by a user, a status signal corresponding thereto may be generated, and at least one other control element is designed to transition into an off state as a consequence of the corresponding status signal.

This has the benefit that, when a control element is operated, unintentionally touching or approaching another control element does not cause a function controllable by the other control element to be unintentionally triggered. This increases operating safety and comfort.

In contrast to integrated interfaces, discrete electrical interfaces only assume one specific function and can therefore quickly and easily fulfill said function. Since, with the control system of the present aspect, the control elements themselves are operatively connected to each other in this way, wherein the operative connection is for example implemented by hardware, for example controlled by voltage, the described transition to the off state can occur directly. The hardware implementation reacts very quickly in this context. It is however also possible for example for these control elements themselves to be each equipped with corresponding control software. In contrast with other technical solutions for establishing the operative connection, through an implementation in a control unit purely by way of example, with which the control elements are coupled via a bus system, the transition to the off state is not dependent on given runtimes, communication windows of the bus system, or the like.

Accordingly, the off state may be produced very quickly, and the operating safety and comfort may be increased.

Generally, a state is termed an off state in which the user touching or approaching the particular control element does not cause an activation of a function assigned to the control element. One speaks of a transition into the off state even when the off state already is present and is retained due to the corresponding status signal. One speaks of a touch by the user already when he approaches the control element enough for the control element to react.

In some embodiments, all other control elements are designed to transition into an off state in the event that at least one control element is touched by a user.

The operating safety of the control system is thus particularly great. This is for example useful when all of the control elements are arranged so close to each other that operating one of the control elements involves the risk that a plurality of other control elements will be unintentionally operated.

In some embodiments, both the at least one control element as well as the at least one other control element are designed to send the corresponding status signal, or to receive the corresponding status signal, and to transition into the off state.

In other words, the off state of the control elements can be controlled both unidirectionally as well as bidirectionally among each other.

This contributes to a further increase in operating safety. If a plurality of control elements are touched simultaneously, for example all of the control elements can transition into the off state, or a prioritization can also be saved. Since touching exactly at the same time is practically almost impossible, a person skilled in the art will however be enabled by the teaching disclosed herein to establish time intervals between the operation of a plurality of control elements that may be considered practically simultaneous. The prioritization or the time intervals as well can also be implemented in hardware.

In some embodiments, the control elements are arranged directly adjacent to each other. Accordingly, the at least one control element and the at least one other control element, or also all control elements, can be arranged directly adjacent to each other.

"Directly" is to be understood as meaning that the control elements are subject to the risk of unintentional operation due to their spatial proximity. This may for example be the case if they are arranged in a common operating area, for example a center console of the vehicle, moreover for example in the form of control strips or control panels. For example, to derive an identifiable distance, a distance is chosen that lies within the range of the length of an average human hand or less. For example, the distance may be up to 250 mm or less.

In some embodiments, the discrete electrical interface includes a peer-to-peer line.

The peer-to-peer line may be regulated by voltage or current.

Another exemplary aspect relates to a method for operating a control system for a vehicle, wherein the operated control system comprises a plurality of touch-sensitive control elements, and the method comprises the following steps:
 touching of at least one control element by a user;
 generating a status signal corresponding to the touch;
 transmitting of the corresponding status signal by the touched control element to the other control elements via a discrete electrical interface;
 transitioning of at least one other control element into an off state as a consequence of the corresponding status signal.

The control system operated in the method may for example be a control system according to the first aspect according to the above description. The technical teaching disclosed with reference to the control system can therefore be applied to the method of the present aspect and vice versa in some embodiments.

In some embodiments, it is provided that all the other control elements transition into the off state as a consequence of the corresponding status signal.

In some embodiments, it is provided that the touching of the at least one control element ends, and a corresponding status signal is generated and is transmitted to the other control elements by the at least one previously touched control element, and then the at least one other control element that was previously in an off state transitions into a functional state, and then the other control element that was previously in the off state is touched by the user and generates the status signal corresponding to the touch and transmits it to the other control elements, and then at least the previously touched control element transitions into the off state as a consequence of the status signal corresponding to the touch.

In this way, the off state of the control elements may also be bidirectionally controlled among each other, which renders the method of the present aspect highly flexible and therefore safe for different operating situations.

In some embodiments, the control system is operated in a vehicle.

Accordingly, a high degree of driving comfort and safety is achieved in some embodiments.

An additional aspect relates to a vehicle comprising a control system pursuant to the above description. Moreover, the vehicle may for example be used in a method according to the preceding discussion. The technical teaching disclosed with reference to the control system and the method can therefore be applied to the vehicle and vice versa.

For example, the vehicle may be a motor vehicle.

Summarized in other words, the teachings herein relate to a system comprising a plurality of touch-sensitive control elements that are arranged adjacent to each other. The control elements may in some embodiments communicate with each other via a voltage-controlled peer-to-peer line and determine when a particular control element should actively respond to touches or is deactivated.

The various embodiments mentioned in this application may be combined with one another, if not stated otherwise in individual cases.

The invention will be explained in further exemplary embodiments below based on the associated drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 3:
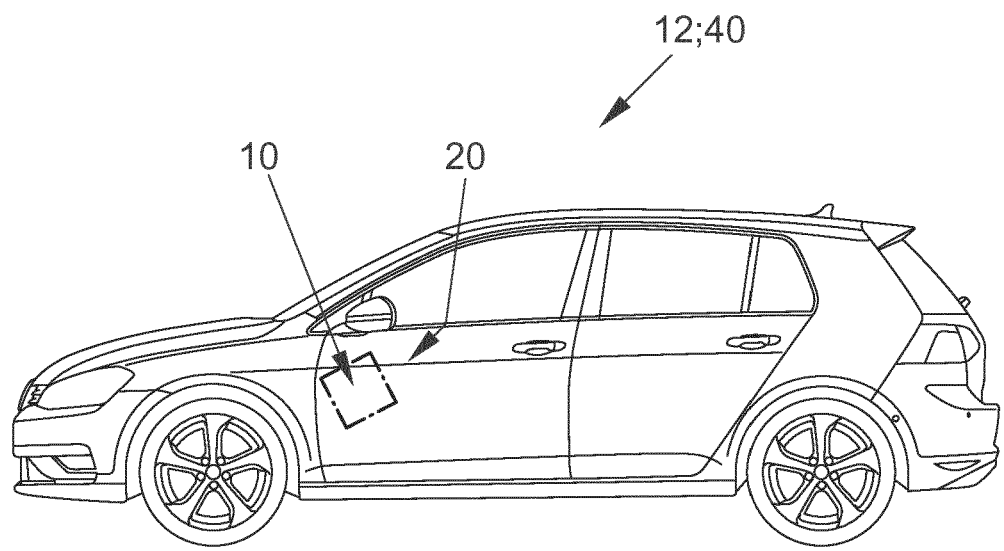
FIG. 3 shows a vehicle in an embodiment.

In the top part, FIG. 1 shows a control system 10 according to an embodiment that is part of a vehicle 12, which is not shown further here (see FIG. 3).

The control system 10 comprises in the present case three touch-sensitive control elements 14, 16, 18. Various functions of the vehicle 12 may be operated using the control elements 14, 16, 18. As an example, the control elements 14, 16, 18 are integrated in a center console 20 of the vehicle 12.

Operating occurs by the touch or approach of a user 22 symbolized by a hand, after which a touched control element triggers a function of the vehicle 12 assigned thereto.

It is apparent that the control elements 14, 16, 18 are arranged directly adjacent to each other. Consequently, it can unintentionally happen that, by way of example as shown, the user 22 also touches the control element 16 with his hand when he wants to operate the control element 14.

If for example, the control element 14 is touched by the user 22, the control element 14 then generates a status signal 24 corresponding to the touch (see FIG. 2). The status signal 24 corresponding to the touch can for example have a signal level 26 with a high value. This may be a voltage or current signal.

By way of example, the signal level 26 is plotted in a diagram in the bottom part of FIG. 1 as the voltage signal over the time t.

In section I of the diagram, it is apparent that the signal level 26 has a low value before being touched that corresponds to a status signal 30 which corresponds to a touch-free state of the control element 14. In this section I, the control elements 14, 16, 18 are in a functional state F in which a touch can trigger the function of the vehicle 12 assigned to the control elements 14, 16, 18.

At the moment of touching the control element 14, the signal level 26 rises to the high value that corresponds to the status signal 24 corresponding to the touch. This is indicated in section II of the diagram.

The status signal 24 corresponding to the touch is transmitted by the touched control element 14 via a schematically indicated discrete electrical interface 28 (see the top part in FIG. 1) to the other control elements 16, 18.

As a consequence, the control elements 16 and 18 transition into an off state S. In the off state S, even touching a control element in an off state S, i.e., the control elements 16, 18 in section II does not cause a triggering of the functions of the vehicle 12 assigned to the control elements being in the off state S. If, as addressed above, the user 22 unintentionally also touches for example the control element 16 when operating the control element 14, it will not react.

Section III of the diagram indicates that the touching of the control element 14 ends, for example because the user 22 has concluded his entry. The status signal 30 is therefore again generated that corresponds with a touch-free state of the control element 14. This is again transmitted by the previously touched control element 14 to the other control elements 16, 18 that were previously in the off state S and that then again transition into the functional state F.

Analogous to sections I to III, the method may continue, wherein for example one of the control elements 16 and 18 is analogously touched by the user 22 and generates the status signal 24 corresponding to the touch. This is analogously transmitted to the other control elements, i.e., the control element 14 and one of the control elements 16 or 18, particularly the one that is also not touched. Analogously, the control element 14 touched during the previous run through sections I to III then also transitions into the off state S.

In sections IV and V of the diagram, measures for stabilizing the operation of the control system 10 are shown. Accordingly by way of example, very short fluctuations in the signal level 26 from the receiving control elements are not immediately interpreted as a switch from the status signal 24 corresponding to the touch to the status signal 30 corresponding to the touch-free state of the control element 14. This correspondingly prevents the receiving control elements, in this case, also by way of example, the control elements 16 and 18, from jumping back and forth in sections IV and V between the off state S and the functional state F. The length of the sections IV and V can be usefully configured by a person skilled in the art by applying the teaching disclosed in this application.

The signal level 26 is transmitted between the control elements 14, 16, 18 in the present case via a peer-to-peer line 32 that is comprised by the discrete electrical interface 28. A person skilled in the art is familiar with electrical circuits comprising for example logic circuits and filters with which the described processes are also enabled purely by hardware.

FIG. 2 shows a table of an exemplary signal level 26 as used in the method from FIG. 1.

The signal level 26 of the sending control element can accordingly assume a high value as shown for example in the table in volts and milliamperes, and thus form the status signal 24 corresponding to the touch. A reaction 34 by the receiving control elements is in this context "off state S".

The signal level 26 of the sending control element can also assume a low value as shown for example in the table in volts and milliamperes, and thus form the status signal 30 that corresponds to the touch-free state of the sending control element. A reaction 34 by the receiving control elements is in this context "functional state F".

In instances in which the signal level 26 of the sending control element assumes a value between the high and the low value, an estimated status signal 36 of the sending control element may for example be assumed that corresponds to the status signal 24 or 30 which corresponds to the last known unambiguous signal level 26 of the sending control element, i.e., derived from the previously existing high or low value. In the case of the status signal 36, a decision is thus made by using this logic, which can also be implemented purely by hardware, that the status signal 24 or 30 exists, depending on which of the status signals 24, 30 existed previously. Correspondingly, a reaction 34 by the receiving control elements is in this context "functional state F" when the sending control element has previously sent the status signal 30, or "off state S" when the sending control element has previously sent the status signal 24.

The signal level 26 of the sending control element may for example also assume a value in cases of error that lie above the high value and accordingly for example form an error signal 38. A reaction 34 by the receiving control elements, or also all control elements 14, 16, 18, may for example be "off state S" in such a case of error. In such cases of errors, a person skilled in the art will provide suitable measures such as for example a reset of the control system 10. Such measures may also be implemented purely by hardware.

FIG. 3 shows a vehicle 12 according to the present aspect which in the present case is a motor vehicle 40.

The motor vehicle 40 comprises a control system 10 according to the present aspect such as for example described in FIG. 1.

The control system 10 is by way of example integrated in a center console 20 of the motor vehicle 40.

LIST OF REFERENCE NUMERALS

10 Control system
12 Vehicle
14 Control element
16 Control element
18 Control element
20 Center console
22 User
24 Status signal corresponding to a touch
26 Signal level
28 Discrete electrical interface
30 Status signal that corresponds to a touch-free state
32 Peer-to-peer line
34 Reaction
36 Estimated status signal
38 Error signal
40 Motor vehicle
F Functional state
S Off state
t Time
U(t) Voltage signal
I Section
II Section
III Section
IV Section
V Section The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A control system for a vehicle comprising a plurality of touch sensitive controls that are each configured to generate a status signal, and in which the controls are operatively connected to each other via a discrete electrical interface, and are configured to transmit their status signal via the discrete electrical interface to the other controls, wherein if at least one control is touched by a user, a status signal corresponding thereto can be generated, and at least one other control is designed to transition into an off state as a consequence of the corresponding status signal.

2. The control system of claim 1, wherein all other controls are configured to transition into an off state in the event of at least one control being touched by a user.

3. The control system of claim 1, wherein both the at least one control as well as the at least one other control are configured to send the corresponding status signal, or to receive the corresponding status signal, and to transition into the off state.

4. The control system of claim 1, wherein the controls are arranged directly adjacent to each other.

5. The control system of claim 1, wherein the discrete electrical interface comprises a peer-to-peer line.

6. A method for operating a control system for a vehicle, wherein the operated control system comprises a plurality of touch-sensitive controls, and the method comprises the following steps:
   upon a touch by a user,
   generating a status signal corresponding to the touch;
   transmitting of the corresponding status signal by the touched control to the other controls via a discrete electrical interface;
   transitioning of at least one other control into an off state as a consequence of the corresponding status signal.

7. The method of claim 6, wherein all other controls transition into the off state as a consequence of the corresponding status signal.

8. The method of claim 6, wherein when the touch of the at least one control ends, generating a corresponding status signal and transmitting the status signal to the other controls by the at least one previously touched control, and transitioning the least one other control that was previously in an off state into a functional state.

9. The method of claim 6, wherein the control system is operated in a vehicle.

10. A vehicle comprising a control system of claim 1.

11. The control system of claim 2, wherein both the at least one control as well as the at least one other control are configured to send the corresponding status signal, or to receive the corresponding status signal, and to transition into the off state.

12. The control system of claim 2, wherein the controls are arranged directly adjacent to each other.

13. The control system of claim 3, wherein the controls are arranged directly adjacent to each other.

14. The control system of claim 2, wherein the discrete electrical interface comprises a peer-to-peer line.

15. The control system of claim 3, wherein the discrete electrical interface comprises a peer-to-peer line.

16. The control system of claim 4, wherein the discrete electrical interface comprises a peer-to-peer line.

17. The method of claim 7, wherein when the touch of the at least one control ends, generating a corresponding status signal and transmitting the status signal to the other controls by the at least one previously touched control, and transitioning the least one other control that was previously in an off state into a functional state.

18. The method of claim 7, wherein the control system is operated in a vehicle.

19. The method of claim 8, wherein the control system is operated in a vehicle.

* * * * *